United States Patent
Caspar (10) Patent No.: US 10,626,556 B2
(45) Date of Patent: Apr. 21, 2020

(54) EXTENSION DEVICE FOR AN AIR GUIDE BOX

(75) Inventor: Roman Caspar, Riehen (CH)

(73) Assignee: PAPRIMA INDUSTRIES INC., Dorval (CA)

( * ) Notice: Subject to any disclaimer, the term of this patent is extended or adjusted under 35 U.S.C. 154(b) by 866 days.

(21) Appl. No.: 13/513,484

(22) PCT Filed: Dec. 2, 2010

(86) PCT No.: PCT/IB2010/003445
§ 371 (c)(1), (2), (4) Date: Jun. 13, 2012

(87) PCT Pub. No.: WO2011/121390
PCT Pub. Date: Oct. 6, 2011

(65) Prior Publication Data
US 2012/0241426 A1     Sep. 27, 2012

(30) Foreign Application Priority Data
Dec. 2, 2009 (DE) .................. 10 2009 056 625

(51) Int. Cl.
*B23K 26/14* (2014.01)
*B26F 3/00* (2006.01)
(Continued)

(52) U.S. Cl.
CPC ......... *D21G 9/0063* (2013.01); *B23K 26/128* (2013.01); *B26D 7/1863* (2013.01);
(Continued)

(58) Field of Classification Search
CPC .................. B26D 7/1863; B26D 7/20; B26D 2007/0068; B26F 3/004; D21F 7/006;
(Continued)

(56) References Cited

U.S. PATENT DOCUMENTS 5,758,556 A   6/1998   Koponen et al.
5,767,481 A   6/1998   Graf
(Continued)

FOREIGN PATENT DOCUMENTS

DE      3904314        8/1990
DE      102006002937   7/2007
(Continued)

OTHER PUBLICATIONS

International Search Report from parent PCT application No. PCT/IB2010/003445.
(Continued)

*Primary Examiner* — Dana Ross
*Assistant Examiner* — James F Sims, III
(74) *Attorney, Agent, or Firm* — J-Tek Law PLLC; Jeffrey D. Tekanic; Scott T. Wakeman (57) ABSTRACT

An air guide box of a paper production installation has a front broad side and a rear broad side, each having a width b. An extension device is attachable to a broad side of the air box guide and has a width of at least 0.25*b and a length of at least 10 mm. A surface thereof is defined with at least one recess having a maximum clear opening of at least 0.1 mm for the through passage of at least one high-pressure water jet or at least one laser beam.

19 Claims, 4 Drawing Sheets

(51) Int. Cl.
*D21G 9/00* (2006.01)
*B26D 7/18* (2006.01)
*D21F 7/00* (2006.01)
*D21F 1/42* (2006.01)
*B26D 7/20* (2006.01)
*B23K 26/12* (2014.01)
*D21F 11/14* (2006.01)
*B26D 7/00* (2006.01)

(52) U.S. Cl.
CPC ............. *B26D 7/20* (2013.01); *B26F 3/004* (2013.01); *D21F 1/42* (2013.01); *D21F 7/006* (2013.01); *D21F 11/14* (2013.01); *B26D 2007/0068* (2013.01); *Y10T 83/0591* (2015.04); *Y10T 83/364* (2015.04)

(58) Field of Classification Search
CPC ......... D21F 1/42; D21F 11/14; D21G 9/0063; Y10T 83/364; Y10T 83/0591; B23K 26/128
USPC ...... 83/177, 402, 407, 425.2, 408, 438, 440, 83/449, 450; 219/121.68, 121.67, 121.69, 219/72, 85
See application file for complete search history.

(56) References Cited

U.S. PATENT DOCUMENTS

| | | | |
|---|---|---|---|
| 5,893,505 A | 4/1999 | Mueller | |
| 6,001,219 A | 12/1999 | Caspar | |
| 6,004,432 A * | 12/1999 | Page | B65H 23/24 162/193 |
| 6,021,699 A | 2/2000 | Caspar | |
| 6,022,452 A | 2/2000 | Caspar | |
| 6,073,825 A | 6/2000 | Hilker | |
| 6,135,000 A | 10/2000 | Caspar et al. | |
| 6,327,948 B1 * | 12/2001 | Tuori | B26D 7/015 83/177 |
| 6,648,198 B2 * | 11/2003 | Demers | D21G 9/0063 226/95 |
| 6,681,670 B2 | 1/2004 | Caspar et al. | |
| 7,166,194 B2 | 1/2007 | Straub et al. | |
| 2002/0124702 A1 | 9/2002 | Caspar et al. | |
| 2007/0125876 A1 * | 6/2007 | Bolling | B65H 23/24 239/270 |
| 2008/0230523 A1 * | 9/2008 | Graf | B26F 3/008 219/121.67 |

FOREIGN PATENT DOCUMENTS

| | | | |
|---|---|---|---|
| EP | 0870583 | 10/1998 | |
| WO | 92/01835 | 2/1992 | |
| WO | WO 2010/139857 A1 * | 12/2010 | ............. F26B 21/00 |

OTHER PUBLICATIONS

International Preliminary Report on Patentability from parent PCT application No. PCT/IB2010/003445.

* cited by examiner

EXTENSION DEVICE FOR AN AIR GUIDE BOX

CROSS-REFERENCE

This application is the U.S. national stage of International Application No. PCT/IB2010/003445 filed on Dec. 2, 2010, which claims priority to German patent application no. 10 2009 056 625.2 filed on Dec. 12, 2009.

TECHNICAL FIELD

The invention relates to an extension device for an air guide box, to an apparatus for cutting a material web, to an air guide box, to a paper production installation, and to a method for cutting a material web in a paper production installation.

RELATED ART

Paper production installations—particularly paper production installations for hygiene paper—operate at the highest speeds available in the industry. Quite a few machines run faster than 2000 metres per minute and process paper tissue having a weight of only 9 to 27 grams per square metre and material web widths of approximately 5.8 m. At these high speeds, the paper material web, or paper web (or, also, the material web) is very susceptible to web tears, and oscillates up and down like a sail, owing to the air carried along with the material web. In the case of such hygiene paper production installations, it is necessary to part off the unsharp, unclean edges of the material web before the material web is wound onto a reel. Preferably, for this purpose, a high-pressure water jet is used for cutting.

An example of such a cutting apparatus is presented in U.S. Pat. No. 6,681,670 B2. This cutting apparatus has a cutting table fitted with a suction device. The suction device disposes of the cut-off edge strip.

In order to prevent the increasing oscillations of the material web that are associated with the high speeds, paper producers have for some time used so-called air guide boxes, or blowing boxes, as a web stabilizer. Such an air guide box is described, for example, in DE 19 60 19 89.

Owing to the ever greater operating speeds of paper production installations, the parting-off of the edge strip is becoming an increasingly difficult task. In addition, the use of air guide boxes negatively affects the possibilities for parting-off edge strips, since there are ever fewer free web surfaces available on which the parting-off could be effected. In addition, the material web becomes undulated after passing through an air guide box, as a result of which a clean cut is rendered difficult.

SUMMARY

The object of the present invention is to provide an apparatus and a method that mitigate the disadvantages of the state of the art.

In particular, the object is achieved by an extension device (44) for an air guide box (40) that can be attached (arranged) over or under a material web (10) transported in a paper production installation and that has a front and a rear broad side, which each have a width b, wherein the extension device (44) has a width of at least 0.25*b and a length of at least 10 mm, and thereby defines a surface, and wherein this surface has at least one recess (45) having a maximum clear opening of at least 0.1 mm for guiding through at least one high-pressure water jet or laser beam (22), and the extension device (44) can be attached (arranged) at a broad side of the air guide box (40).

The paper production installation is an installation in which a material web, particularly of hygiene paper, can be transported, typically via a multiplicity of rollers, in a transport device, and can be wound up at the end onto a reel (a roller).

The material web—disregarding process-related oscillations, folds and distortions—spans an ideal material web plane. The length is an extent substantially parallel to the material web plane and to the transport direction of the material web. The width is an extent substantially parallel to the material web plane and perpendicular to the transport direction. The height is an extent substantially perpendicular to the material web plane. In order to simplify description of the subject according to the invention, the following is based on a material web whose material web plane is perpendicular to the gravitational acceleration vector. A different orientation of the material web plane is also possible, however. Thus, for example, the material web plane can also be parallel to the gravitational acceleration vector, or include an angle of between 0° and 90° with the latter.

An air guide box is preferably a box-shaped component having a flat, preferably continuous base surface as a stabilizing surface having a width that is preferably greater than or equal to the width of the material web. The length is application-specific. The stabilizing surface is preferably highly polished.

The air guide box can be arranged over or under a material web transported in a paper production installation. In the paper production installation, the air guide box is preferably arranged over the material web. The air guide box is arranged with its stabilizing surface close to the material web. The stabilizing surface is preferably parallel to the material web. In order to simplify description of the subject according to the invention, the following is based on an air guide box that can be arranged, or is arranged, above the material web. In this preferred case, the stabilizing surface of the air guide box is then the underside of the air guide box.

The front broad side and rear broad side of the air guide box are the end sides of the air guide box, which lie transversely in relation to the direction of running of the material web. The front broad side is that broad side at which the material web first passes the air guide box. It is thus located upstream. The rear broad side is that broad side that is located downstream.

The arrangement of an air guide box with the stabilizing surface close to the material web results in stabilization of the material web. The air carried along with the material web draws further ambient air along after itself, as a result of which a suction is produced between the stabilizing surface and the material web, and the material web is thus stabilized.

The stabilizing surface preferably has, located upstream, an air outlet gap preferably extended over the entire width of the surface and/or has a row of small air outlet openings and/or air nozzles, which are so aligned that they generate one or more air jets that is/are aligned substantially parallel to the surface and in the direction of running of the material web and that has/have a substantially higher flow speed than the running speed of the material web. Preferably, the air outlet gap and/or a row of small air outlet openings and/or air nozzles are or is recessed into the surface. The air guide box is typically hollow on the inside, such that compressed air can be supplied at a connection of the air guide box and this compressed air can emerge through the air outlet gap and/or a row of small air outlet openings and/or air nozzles.

Compressed air is blown in, through the air outlet openings on the stabilizing surface of the air guide box, into the gap between the air guide box and the material web, in the direction of running of the material web. Such an air guide box is also referred to as a dynamic air guide box. Owing to the accelerated air, a suction is produced, which draws in and stabilizes the material web. The stabilizing effect of the air guide box is increased yet further by the air jets out of the air outlet openings, the air jets being fast relative to the ambient air. In the direction of running of the material web, an even greater negative pressure is produced between the material web and the lower surface of the air guide box. The negative pressure acts as a suction upon the material web, which is then drawn onto the surface and stabilized.

The extension device for an air guide box is preferably a metallic plate (for example, of special stainless steel, or of another, weldable, non-rusting metal), whose height is preferably adapted to achieve a self-supporting stability. Particularly preferably, the extension device is of the same material as the stabilizing surface of the air guide box.

The underside of the extension device is preferably a smooth, preferably highly polished surface. The top side of the extension device preferably has at least one rib, to stabilize the shape of the extension device. The extension device has two broad sides, one broad side preferably being the broad side by which the extension device can be attached to the broad side of an air guide box. This is the fastening side. Preferably, the extension device has a rounded edge on the broad side that is not the fastening side, such that the underside of the extension device graduates towards this broad side in an edgeless manner. Preferably, a rib is attached to this broad side, along the preferably entire width of the extension device. Particularly preferably, the extension device has two fastening sides, as a result of which the extension device can also be attached between two air guide boxes, or both at the front broad side and at the rear broad side of an air guide box. The extension device preferably has a width of at least c*b, wherein c preferably assumes one of the following values: 0.25, 0.3, 0.35, 0.4, 0.45, 0.5, 0.55, 0.6, 0.65, 0.7, 0.75, 0.8, 0.85, 0.9, 0.95, 1.0. If the front broad side of the air guide box has a width b1 and the rear broad side of the air guide box has a width b2, differing therefrom, for the purpose of determining the width of the extension device the parameter b is replaced by the width b1 or b2 of that broad side of the air guide box to which the extension device is to be attached.

The extension device preferably has a length of preferably at least 10 mm, preferably 50 mm, preferably 100 mm, preferably 150 mm, particularly preferably a length in the range from 100 mm to 400 mm, quite particularly preferably a length of approximately 300 mm.

An advantage of such an extension device that can be attached to an air guide box is that the effect of the air guide box, i.e. the suction, or stabilizing effect, in the direction of running of the material web or in the direction counter thereto, is extended beyond the dimension of the air guide box if the extension device is attached to the air guide box. In spite of the presence of recesses in the extension device, the material web is stabilized over the majority of the width of the material web, such that the region at which cutting is effected is also stabilized.

The ability to attach the extension device at a broad side of the air guide box allows the stabilizing surface of an air guide box to be extended, in a preferably flush connection, through the underside of the extension device. The extension device effects an extension of the base surface of the air guide box. Preferably, the extension device is attached to the air guide box without a gap or interval. Preferably, there is no step between the underside of the extension device and the stabilizing surface of the air guide box. The extension device can preferably be attached to the air guide box by one of the following types of connection: weld seam, screws, screws with brackets, adhesive and/or other standard machine elements.

A recess is a region in the surface, spanned by a length and width of the extension device, in which the extension device is partially discontinuous, i.e. has a hole. A recess is preferably a bore, preferably an elongate bore. Preferably, the recess is rectangular. Preferably, it interrupts a longitudinal side of the extension device and/or is provided at the edge region of the extension device. Preferably, the extension device has two recesses, which are each attached in the region of the longitudinal sides of the extension device. Particularly preferably, the extension device has a third recess in the region of the centre point of the width—through this recess, an edge cutter and/or a centre cutter for the paper web can be realized.

A clear opening of a recess in a surface having a width and a length is geometrically defined as follows. The clear opening denotes the segment length of a connecting line that can be drawn from any edge point of the recess to any other edge point of the recess. If the original surface boundary is interrupted by the recess, an edge point can also be located on the original surface boundary. The maximum clear opening denotes the segment length of the longest line that can be drawn between two edge points of the recess. The maximum clear opening in the longitudinal direction is the segment length of the longest connecting line that can be drawn parallel to the length between two edge points. The maximum clear opening in the transverse direction is the segment length of the longest connecting line that can be drawn parallel to the width between two edge points.

The definition of a maximum clear opening of a recess in a three-dimensional body having a width, a length and a height can be derived as follows. A projection direction is determined, and the body, and the three-dimensional edge points of the recess, are projected onto a plane perpendicular to the projection direction. There is then produced on this plane a projected recess for which the clear opening, the clear opening in the longitudinal direction and the clear opening in the transverse direction can be determined according to the last paragraph. The maximum clear opening (in the longitudinal direction, or transverse direction) of a recess in a three-dimensional body is the maximum clear opening (in the longitudinal direction, or transverse direction) of the projected recesses of all projection directions. The projection can be represented—disregarding diffraction and reflection effects—as the shining of a light beam through the recess of a body. The light spot on a matt disc arranged perpendicularly in relation to the light beam and on the other side of the body is the projected recess.

Example: The maximum clear opening of an inclined drilled hole in a board is the diameter of the drill bit used for drilling.

The basis for the term clear opening for the purpose of specifying a recess in the extension device is the definition for a maximum clear opening of a recess in a three-dimensional body having a width, a length and a height, preferably the definition for a maximum clear opening of a recess in a surface having a width and a length parallel to the material web plane. This applies analogously to the maximum clear opening in the transverse direction and the longitudinal direction.

The maximum clear opening of a recess is at least 0.1 mm.

The maximum clear opening in the longitudinal direction of a recess is preferably at least 0.1 mm, particularly preferably has a value in the range between 10 mm and 400 mm, preferably between 15 mm and 380 mm, preferably between 20 mm and 350 mm.

In a special case, the maximum clear opening in the longitudinal direction of a recess has the same dimension as the length of the extension device. In the case of a rectangular recess, the latter is then to be equated with a shortening, or interruption, of the extension device in respect of the width. Conversely, each extension device has at least one recess, if the width of the extension device is less than the width b of that broad side of an air guide box for which the extension device is provided. The recess/es, after attachment of such an extension device at the appropriate side of the air guide box, is/are then the difference region/s that exists/exist in distinction from a notionally attached extension device, the notionally attached extension device having a width equal to the width b of the appropriate broad side of the air guide box but being otherwise identical to the actually attached extension device.

The maximum clear opening in the transverse direction of a recess is preferably at least 0.1 mm, particularly preferably has a value in the range from 100 mm to 450 mm. Particularly preferably, the maximum clear opening in the transverse direction of a recess is 350 mm.

The recess is preferably suitable for the through passage of at least one high-pressure water jet or laser beam, by means of which water jet or laser beam the material web can be cut during subsequent operation. Preferably, therefore, a straight rod of round cross-section, having the diameter of a high-pressure water jet or laser beam to be used subsequently, can be guided through the recess. The diameter of a high-pressure water jet or laser beam used for cutting the material web is preferably at least 0.1 mm. Preferably the recess is of such a type that a different cutting means, suitable for cutting the material web, can also be passed or guided through the recess.

The advantage of this extension device is that the cutting point for the cutting of the material web, for example of an edge strip, can now be effected in a region of the material web in which the extension device for an air guide box spans the material web. Thus, on the one hand, parting-off is performed where the material web does not have any oscillations and/or undulations. A clean cut is therefore possible. On the other hand, the problem has been solved that, owing to the parting-off close to an air guide box, the parting-off operation now no longer requires a large region of free web surfaces that, owing to the increasingly dense application of air guide boxes in the transport path of the material web, is ever less frequently available.

Furthermore, the object is achieved by an apparatus for cutting a material web (10), comprising at least one cutting device (20) for generating at least one high-pressure water jet or laser beam (22), wherein the apparatus for cutting a material web (10) comprises an extension device (44) that is arranged above or below the material web (10), and wherein at least one of the cutting devices (20) provided is arranged at the side of, over, or under the material web (10) and at the level of the extension device with respect to the transport direction of the material web and can thus be so advanced to the material web that at least one high-pressure water jet or laser beam (22) can be passed through a recess (45) provided in the extension device (44).

The material web has a width in the range from preferably 2 m to 10 m, particularly preferably 4 m to 7 m, quite particularly preferably 5.5 m to 5.9 m, preferably approximately 5.8 m. In the case of the production of hygiene paper, in particular, the material web has unsharp, unclean edges at the longitudinal sides. It is therefore necessary to part off these edges, in order for the material web to have clean edges at the end. For this purpose, there is provision for at least the parting-off of one edge strip, but preferably of a respective edge strip at each longitudinal side of the material web, i.e. the parting-off consists in a continuous longitudinal cut of the running material web through the use of at least one cutting device, such that, downstream from the cut, there is an edge strip that is substantially detached from the material web and that can then preferably be guided away from the material web, and the material web is narrower by the width of the edge strip.

To simplify description, and in keeping with the description hitherto, the following is based on an arrangement of the extension device above the material web. In this case, the underside is then the preferably smooth, preferably highly polished side of the extension device, and facing towards the material web.

The cutting device is particularly preferably equipped with one or more features of the cutting apparatuses described in U.S. Pat. No. 6,681,670 B2. It is preferably movable. Preferably, it is movable relative to the extension device along the width of the extension device. Preferably, it is aligned to part off an edge strip from the material web running through the paper machine. Particularly preferably, the cutting device has at least one high-pressure jet nozzle, through which, preferably, a high-pressure jet, consisting of water and/or of air, can be generated as a cutting means. Quite particularly preferably, the cutting device has means for generating at least one laser beam. Particularly preferably, the cutting device can be fed at least partially, preferably laterally, i.e. coming from the edge of the material web, into one of the recesses provided in the extension device.

Preferably, the apparatus for cutting a material web has two cutting devices, each of which can be advanced to the region of the edges of the material web, particularly preferably a further cutting device, which can be advanced into the region of the centre point with respect to the width of the extension device, quite particularly preferably one cutting device for each of the recesses provided in the extension device.

Preferably, at least one of the cutting devices provided is arranged on one side of the material web, at the level of the extension device.

Preferably, a cutting device is so arranged and can be so advanced to the material web that it can be advanced, from a distant position close to a recess provided in the extension device, either onto the top side of the extension device (case a) or onto the underside of the extension device (case b)—the material web then being located between the extension device and the cutting device. The cutting device is then preferably so aligned in the advanced position that a high-pressure water jet or laser beam either first goes through the recess in the extension device, and this water jet or beam then cuts the material web (case a), or this water jet or beam first cuts the material web and then continues on through the recess in the extension device (case b).

Furthermore, the object is achieved by an apparatus for cutting a material web (10), wherein the apparatus for cutting a material web has at least one cutting table (23).

Preferably, the cutting table can be advanced to the material web, such that, preferably, the cutting table and at least one of the cutting devices, which is advanced to the material web, are substantially opposite the top side and underside of the material web and, furthermore, preferably, the cutting table is located in the emission line of at least one high-pressure water jet or laser beam of the cutting device. Preferably, the cutting table is a surface of a material that is resistant to the cutting means used, which surface faces towards the material web. For example, the cutting table is a surface of special stainless steel. Such a cutting table is presented, for example, in U.S. Pat. No. 6,681,670 B2. Thus, the cutting table preferably has an opening, through which a high-pressure water jet or laser beam that is used can be received and/or diverted. The preferred length of a cutting table according to the invention lies in a range of, preferably, 50 to 400 mm, particularly preferably 100 mm to 300 mm, the preferred width in a range between, preferably, 150 mm and 400 mm, particularly preferably 200 mm and 350 mm. The surface of the cutting table preferably has a length and a width equal to the maximum clear opening of the recess in the longitudinal and transverse direction, respectively, of the recess. Preferably, the cutting table constitutes one structural unit together with a cutting device, such that the cutting table and the cutting device are always opposite one another and can be traversed together.

In addition, the cutting table preferably has an inclined surface on its front broad side (located upstream). This inclined surface is preferably a metal plate or a plastic panel, which preferably has the same dimension transversely as the cutting table. Preferably, the inclined surface encloses, with the vector of the direction of running of the material web, an angle of less than 90 degrees, preferably of less than 60 degrees, particularly preferably less than 30 degrees. Preferably the edge of the inclined surface that faces towards the material web is at the same distance from the material web as is the surface of the cutting table that faces towards the material web. Preferably, the inclined surface is attached directly to the cutting table. Preferably, the inclined surface adjoins the cutting table surface, or the surface of the cutting table that faces towards the material web, in a flush manner. Particularly preferably, the inclined surface is at least partially curved. Particularly preferably, the front broad side of the cutting table is already designed as a corresponding inclined surface.

Preferably, at least one cutting table has a shaft for removing the cut-off edge strip. The shaft is preferably arranged in such a way that the parted-off edge strip slides automatically into the shaft, preferably as a result of the motion of the material web. Preferably, the shaft has a curvature that constitutes a transition from the plane of the material web into the shaft, which is preferably aligned substantially perpendicularly in relation to the plane of the material web. Preferably, the shaft is connected to a device for generating a negative pressure within the shaft.

Preferably, the apparatus for cutting a material web has at least one air guide box, to which an extension device is attached at the front broad side and/or the rear broad side.

Furthermore, the object is achieved by an air guide box (40), to which there is attached an extension device (44) for an air guide box, or an apparatus for cutting a material web, which comprises at least a cutting device and an extension device.

Particularly preferably, the extension device and/or a device for cutting a material web has already been fixed to the air guide box during the production of the latter. Quite particularly preferably, the extension device and the air guide box are designed as one structural component, i.e. produced, for example, in one casting. Preferably, the extension device is realized as a larger base plate of the air guide box.

Furthermore, the object is achieved by a paper production installation, wherein the paper production installation has an apparatus for cutting a material web (10), which comprises at least a cutting device and an extension device, or wherein the paper production installation has an air guide box to which there is attached an extension device (44) for an air guide box, or an apparatus for cutting a material web, which comprises at least a cutting device and an extension device.

Particularly preferably, the extension device is designed as a hollow air guide box (optionally having additional air nozzles, or having one or more air inlet gap(s)), such that, solely as a result of the extension device attached over the material web, a suction is produced between the underside of the extension device and the material web and stabilizes the material web. The extension device is then, as it were, an air guide box having at least one recess for the through passage of at least one high-pressure water jet or laser beam.

The object is furthermore achieved by a method for cutting a material web (10), running in the longitudinal direction in a paper production installation, by means of at least one high-pressure water jet or laser beam (22), generated by a cutting device (20), in the region of an air guide box (40), which has a front broad side (41.1) and a rear broad side (41.2), each having a width b, comprising the steps of:

attaching an extension device (44) to a broad side of the air guide box (40), providing the extension device with at least one recess (45), cutting the material web (10) by means of at least one high-pressure water jet or laser beam (22), in the region of at least one recess (45).

The region of an air guide box, according to the invention, in which the material web is cut preferably begins at a broad side, preferably the rear broad side, and preferably ends at a distance of 400 mm, particularly preferably 300 mm, furthermore preferably 200 mm, furthermore preferably 150 mm from the air guide box in the longitudinal direction. Preferably, in this case, it includes the entire width of the material web. Particularly preferably, the region according to the invention includes a width of, preferably 450 mm, particularly preferably 350 mm, quite particularly preferably 100 mm from both edges of the material web to the centre of the material web.

Hitherto, this region had proved to be very unfavourable for a satisfactory quality of cut, owing to, inter alia, the transverse wave that forms in the material web after passing an air guide box. The further method steps, however, enable a high-quality cut to be realized in this region.

The attaching of an extension device is preferably effected through one of the following fastening methods: welding, screw connection, adhesive bonding, and/or through fastening by means of standard machine elements.

Preferably, a broad side of the extension device is attached to a broad side of the air guide box, the underside of the extension device being connected to the underside, or stabilizing surface, of the air guide box in a flush and preferably parallel manner.

Providing the extension device with at least one recess preferably consists in milling out and/or sawing out and/or drilling and/or etching out at least one recess. Providing the extension device with at least one recess is preferably already effected before the attaching of the extension device, the extension device preferably being provided with at least one recess as early as during the production of the extension device, preferably provided with at least one recess by a casting method.

The cutting of the material web is preferably a parting-off of at least one edge strip from the material web and/or the dividing of the material web into at least two parts by a cut, for example in the centre of the material web. The cutting is preferably effected by means of an appropriate cutting means other than a high-pressure water jet.

In a further method according to the invention, at least one high-pressure water jet or laser beam (22) is moved in at least one recess (45) of the extension device (44) and/or at least one cutting device (20) is moved in the transverse direction relative to at least one recess (45) of the extension device (44).

The movement of at least high-pressure water jet or laser beam in at least one recess is preferably a movement in the transverse direction, in which a high-pressure water jet or laser beam crosses the infinite plane notionally spanned by the underside of the extension device, and the crossing point is located within the edge points of at least one recess and/or within the edge points of the original boundary of the extension device, at least at one instant. Preferably, movement also has time phases, in which the crossing point is located outside the edge points of at least one recess and outside the edge points of the original boundary of the extension device.

The movement of at least one cutting device relative to at least one recess is preferably a traversing of the cutting device in the transverse direction, preferably at the same position in the longitudinal direction as the extension device.

The movement of at least one high-pressure water jet or laser beam in at least one recess and the movement of at least one cutting device relative to at least one recess are preferably effected simultaneously. Particularly preferably, the movement of at least one cutting device relative to at least one recess without simultaneous movement of at least one high-pressure water jet or laser beam in at least one recess occurs in that no high-pressure water jet or laser beam is generated by the cutting device while it is being moved. Furthermore, particularly preferably, the movement of at least one high-pressure water jet or laser beam without simultaneous movement of at least one cutting device relative to at least one recess occurs in that at least one high-pressure water jet or laser beam is moved through an alteration of the direction of emission (e.g. in the case of a twisted jet).

In a further method according to the invention, at least one cutting table (23) is so positioned on the side of the material web at which a high-pressure water jet or laser beam (22) emerges from the plane of the material web (10) after the cutting operation that the high-pressure water jet or laser beam (22) that has emerged from the plane of the material web (10) is substantially incident upon the cutting table (23) or is routed into an opening provided in the cutting table (23).

In the case of a preferred arrangement of a cutting device over the material web, the side of the material web at which a high-pressure water jet or laser beam emerges from the plane of the material web after the cutting operation is the underside of the material web.

The positioning of the cutting table is preferably effected through a single arrangement of the cutting table in the region in which a high-pressure water jet or laser beam can be incident. Particularly preferably, the positioning is effected continuously and parallel to a movement of the high-pressure water jet or laser beam.

Substantially, preferably the entire volume of the high-pressure water jet or laser beam is incident upon the cutting table, or is diverted through an opening provided in the cutting table. Preferably, splashes of water or stray jets (air or water) are not incident upon the cutting table.

In a further method according to the invention, at the beginning of the parting-off operation the transverse side of the newly beginning edge strip (11) is knocked off from the material web (10) by a compressed-air jet, and the thus generated start of the parted-off edge strip (11) is forced into a shaft (25).

The knocking off is preferably effected by an air blast after the compressed-air jet has been switched on. Preferably, a recess provided in an extension device is therefore also arranged to effect a compressed-air jet.

BRIEF DESCRIPTION OF THE DRAWINGS

The invention is now to be illustrated further, by way of example, with reference to drawings, wherein.

DETAILED DESCRIPTION OF THE INVENTION

Figure 1:
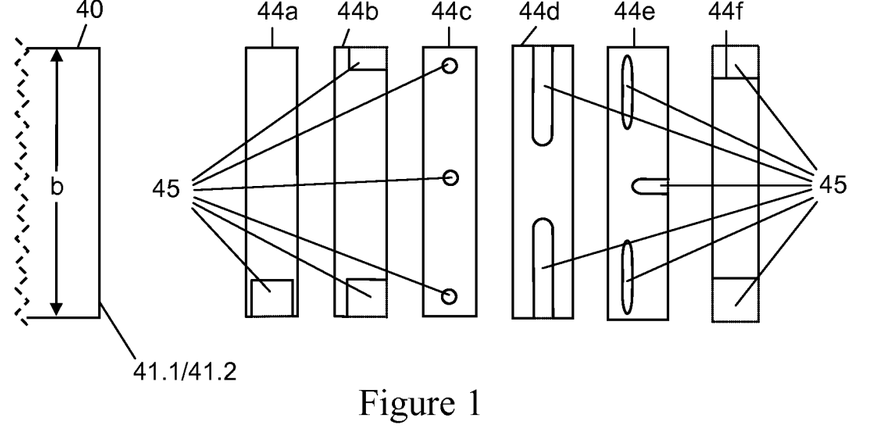
FIG. 1 shows a top view of six differing embodiments of an extension device according to the invention, each having differing recesses.

FIG. 1 shows a top view of the top side of six different embodiments 44a-44f of an extension device according to the invention, each having differing recesses 45. The different embodiments 44a-44f can each be attached to an air guide box 40, on the front broad side 41.1 or the rear broad side 41.2. The air guide box has a width b, and a portion thereof is represented at the left edge of the figure.

The extension device 44a has a rectangular recess 45 at a transverse end, the recess 45 interrupting a longitudinal side. The extension device 44b has two rectangular recesses 45, at both transverse ends, the recesses going through the two longitudinal sides and a broad side of the extension device 44b. The extension device 44c has three circular recesses 45, two being at the transverse ends and one in the centre. The extension device 44d has two elongate and rounded recesses 45, the recesses 45 going through the longitudinal sides. The extension device 44e has two slot-type recesses 45 and an elongate, rounded recess 45, the latter interrupting a broad side of the extension device 44e. The extension device 44f has two rectangular recesses 45, the width of the extension device 44f being shortened by the recesses 45. The original boundaries of the respective extension devices 44a-44b, 44d-44f are indicated by a dotted line.

In this example, the production of the extension devices 44a-44f is effected separately from the production of an air guide box 40. They are then mounted onto a broad side of an air guide box (41.1 or 41.2), either at the air guide box production premises or in the paper factory. In the drawing, the left-hand broad sides of the embodiments 44a-44f are, in each case, the broad sides that are mounted jointlessly onto a broad side of an air guide box 40. In the paper production installation, the material web would then run closely past the underside of the respective extension device 44a-44f.

The different embodiments 44a-44f each have differing advantages and disadvantages, which are considered with respect to the subsequent application.

The embodiment 44a has only one recess 45, and is therefore suitable for the case in which cutting is to be effected only at one edge of a material web. The recess 45 of the embodiment 44a is relatively large, such that a cutting device can be advanced laterally (thus, in the drawing, coming from below) in its entirety into the recess 45. The embodiment 44b has two recesses 45. Unlike the recess 45 of the embodiment 44a, these recesses go through a broad side of the extension device 44b. The embodiment 44b is particularly suitable for cutting operations in which a large amount of floating material is formed, which then cannot settle between the extension device 44b and the material web. For this purpose, the embodiment 44b is attached at the rear broad side of the air guide box. The three recesses 45 in the embodiment 44c enable cuts to be made both in the edge region and in the centre. The small dimensions of the recesses result in a highly stabilizing effect upon the material web. Owing to the elongate recesses 45 in the transverse direction of the extension device 44d, the latter is particularly suitable for cuts for which a large traversing capability of the high-pressure water jet in the transverse direction is required. A similar advantage is offered by the slot-like, outer recesses 45 of the extension device 44e, although these recesses are less wide. In addition, the embodiment 44e can be used to effect a central cut, which may possibly give rise to a large amount of floating material and dirt particles. The embodiment 44f shows the simplest embodiment of a recess that provides approximately the same benefit as the embodiment 44b, but with a lesser production resource requirement. Here, in spite of the extension device 44f actually being shorter, the material web is sufficiently stabilized in the central region so that no large disturbing stresses can be produced in the material web, whereby, in contrast to the case of no stabilizing device being provided, the edge regions are also substantially better stabilized and have less oscillation.

Figure 1A:
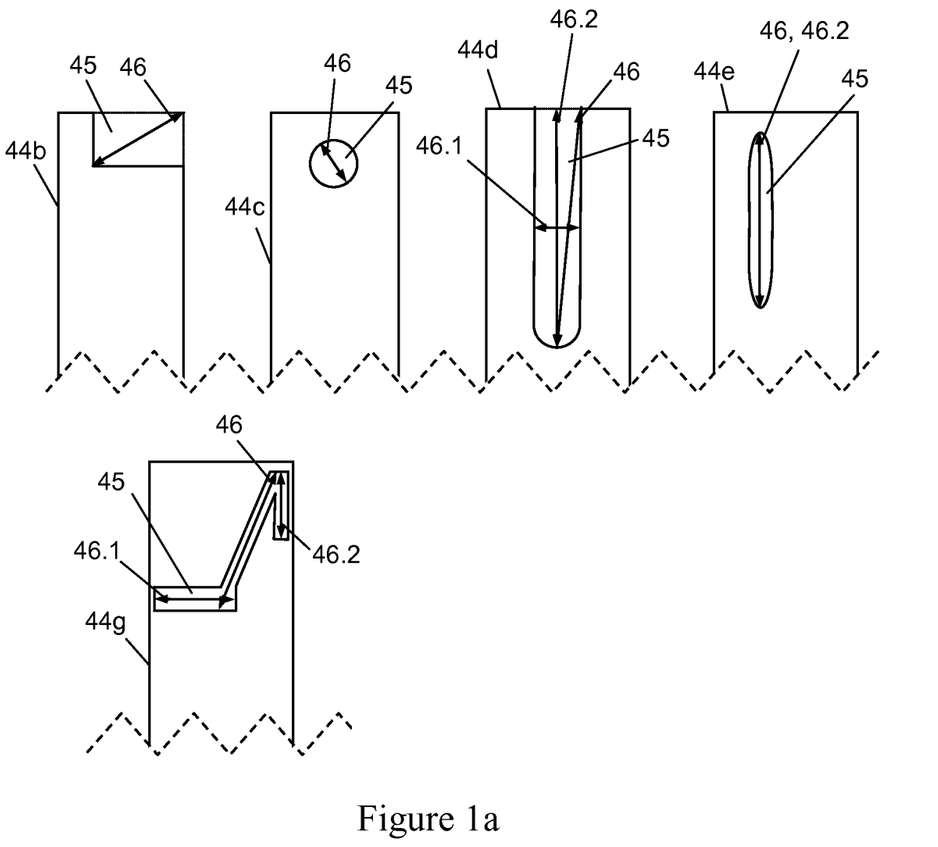
FIG. 1a shows an enlargement of the top views of selected recesses in extension devices according to the invention, for the purpose of illustrating the clear opening.
Figure 2:
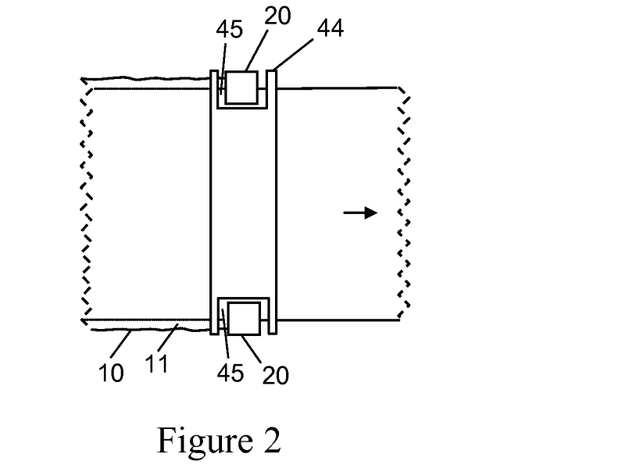
FIG. 2 shows a top view of an apparatus according to the invention, for cutting a material web, having two cutting devices and an extension device.

FIG. 1a shows an enlargement of the top views of selected recesses 45 in embodiments 44b-44e, 44g of extension devices according to the invention, for the purpose of illustrating the clear opening. In the case of the recess 45 of the embodiment 44b, the maximum clear opening 46 is the diagonal through the recess 45. In the case of the recess 45 of the embodiment 44c, the maximum clear opening 46 is the diameter of the round recess 45. In the case of the recess 45 of the embodiment 44d, the maximum clear opening 46 is the connecting line from a corner point of the recess 45 and the longitudinal side of the extension device 44d to the middle point of the rounding of the recess 45. For the extension device 44d, the maximum clear opening in the longitudinal direction 46.1 and the maximum clear opening in the transverse direction 46.2 are also shown. It is to be noted here that the maximum clear opening in the transverse direction 46.2 is a connecting line from the middle point of the rounding of the recess 45 to a point—the middle point—of the original surface boundary of the extension device 44d. In the case of the embodiment 44e, the maximum clear opening 46 and the maximum clear opening in the transverse direction 46.2 of the recess 45 coincide in the arrow shown. In the case of the recess 45 of the embodiment 44g, the maximum clear opening 46, the maximum clear opening in the longitudinal direction 46.1 and the maximum clear opening in the transverse direction 46.2 are each differing connecting lines between edge points of the recess 45. In respect of these embodiment examples, I can state that all examples do not function in practice—apart from 44a and 44b, or the opening of 44e let out in the centre FIG. 2 shows a top view of an apparatus according to the invention, for cutting a material web 10, having two cutting devices 20 and an extension device 44. The apparatus is an apparatus for parting off two edge strips 11 of the material web 10. The cut line is indicated by dots. The extension device 44 has two recesses 45 at the transverse ends of the extension device 44, the clear openings of which recesses, in the transverse direction and in the longitudinal direction, are each greater than the width and length of the cutting devices 20.

During operation, the material web 10 runs past the underside of the extension device 44 in the direction shown. The presence of the extension device 44 alone already effects stabilization—even if slight—of the material web 10. This stabilization can be reinforced in that the extension device, in a manner similar to an air guide box, is provided with an aerodynamic profile (not shown).

This arrangement reduces the frequency of oscillations, folds and undulations in the transverse and/or longitudinal direction, which would have a substantially negative effect upon the quality of cut.

Figure 3:
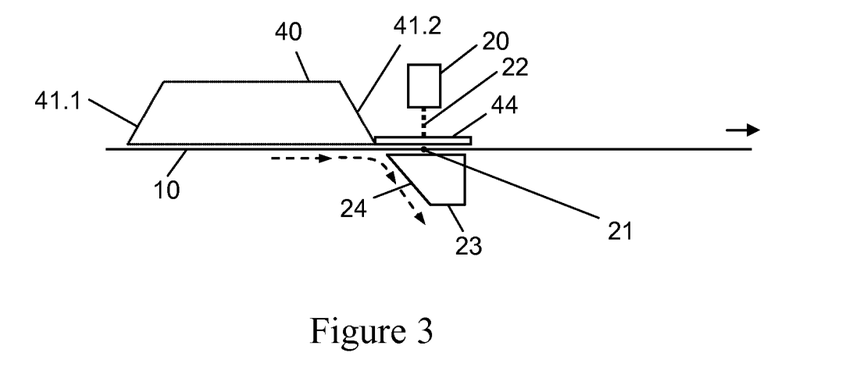
FIG. 3 shows a side view of an apparatus according to the invention, for cutting a material web, having a cutting device, an extension device, and a cutting table comprising an inclined surface.

FIG. 3 shows a side view of an apparatus, according to the invention, for cutting a material web 10, having a cutting device 20, an extension device 44 and a cutting table 23, which has an inclined surface 24. This apparatus can be fastened to the rear broad side 41.2 of an air guide box 40—indicated by dots. Here, the cutting device is attached over the extension device 44.

During operation of the apparatus for cutting a material web 10, the material web 10 runs through under the extension device 44. A high-pressure water jet 22 is emitted from the cutting device 20, through the recess 45, onto the material web, as a result of which the latter is cut in a cut point 21. The air (indicated by broken-line arrows) that is carried along with the material web 10 is deflected away from the material web 10 by the inclined surface 24. This air can then no longer run between the cutting table 23 and the material web 10. The material web 10 is therefore substantially prevented from floating, or flying, over the cutting table 23. As a result, the quality of cut is improved, and the risk of tearing of the material web 10 is reduced. The cutting table 23 serves, on the one hand, to stabilize the cutting operation. On the other hand, the surface of the cutting table 23 stabilizes the material web 10 per se. Furthermore, by means of the cutting table 23, the high-pressure water jet 22 is received in a discharge tube (not shown).

The arrangement shown enables the cutting to be effected in a region of the material web 10 that is stabilized by (the air guide box 40 and) the extension device 44. The material web 10 therefore does not oscillate upwards or downwards, and is not moved transversely in relation to the high-pressure water jet 22, which would result in a poor quality of cut. Folds that result from the stress in the material web 10 when the material web 10 is not stabilized now no longer affect the quality of cut. The parting-off process therefore does not give rise to any wave-shaped edges of the material web 10.

Figure 4:
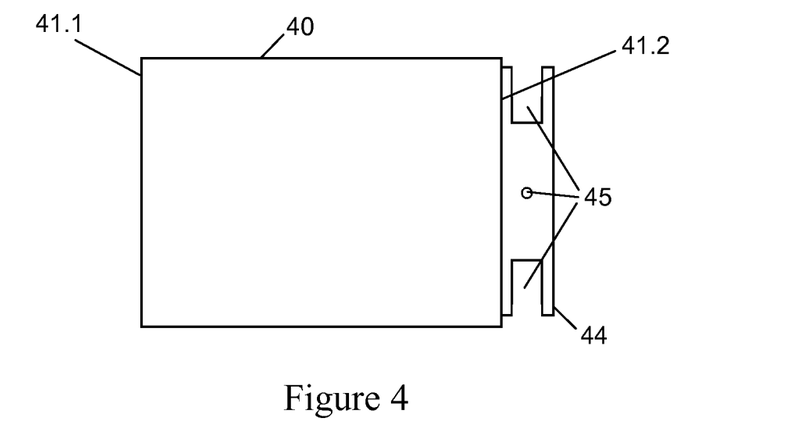
FIG. 4 shows a top view of an air guide box according to the invention, welded onto which there is an extension device having two recesses and an optional recess.

FIG. 4 shows a top view of an air guide box 40 according to the invention, to which an extension device 44, having two recesses 45, is welded at the rear broad side 41.2 of the air guide box 40. The extension device 44 has an optional recess 45 in the centre of the extension device 44.

Figure 5:
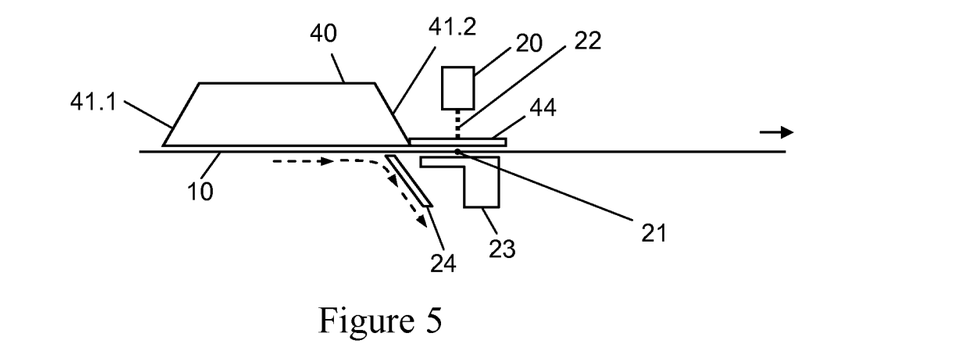
FIG. 5 shows a side view of an air guide box according to the invention, screwed onto which there is an apparatus for cutting a material web, having an extension device and a cutting table that has an inclined surface arranged upstream.

FIG. 5 shows a top view of an air guide box 40 according to the invention, screwed onto which there is an apparatus for cutting a material web, having an extension device 44 and a cutting table 23, which has an inclined surface 24 arranged upstream. This difference in relation to the inclined surface 24 from FIG. 3 is that here the inclined surface 24 is not connected to the cutting table 23. The stabilizing effect of the air guide box 40 is extended by the extension device 44. The cutting point 21 is therefore located in the region of the material web 10 stabilized by the air guide box 40 and the extension device 44.

Figure 6:
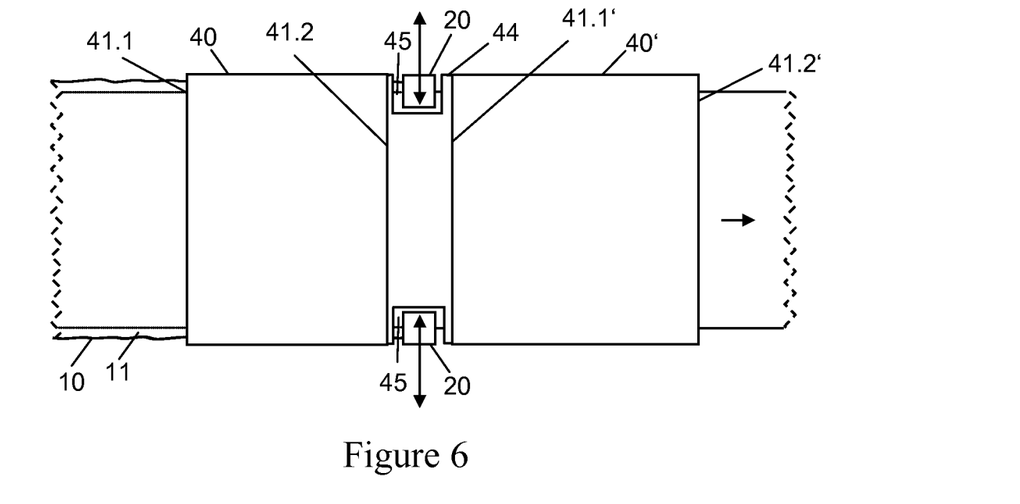
FIG. 6 shows a top view of two air guide boxes according to the invention, attached to which there is an apparatus for cutting a material web, having an extension device that has two recesses and two cutting devices.

FIG. 6 shows a top view of two dynamic air guide boxes 40 according to the invention, attached to which there is an apparatus for cutting a material web, having an extension device 44 having two recesses 45 and having two cutting devices 20. A cutting device 20 is assigned to each of the recesses 45. In this example, the air guide boxes 40 and 40' span the material web 10 over its entire width.

This exemplary arrangement enables two edge strips 11 to be parted off, from both sides of the material web 10, during operation of the paper production installation. The first dynamic air guide box 40, located upstream, stabilizes the material web 10. The air guide box 40 blows an air jet (not shown), which is faster than the air carried along with the material web 10, into the space between the material web 10 and the underside of the air guide box 40. As a result, a negative pressure is generated between the air guide box 40 and the material web 10, in a manner comparable to the effect of an aircraft aerofoil, such that the oscillations of the material web 10 resulting from the running speed are damped to a large extent. The extension device 44 continues the air current of the first dynamic air guide box 40, whereupon a second dynamic air guide box 40', which adjoins directly downstream, again reinforces the stabilizing effect. Through the recesses 45 at both transverse sides of the extension device 44, the cutting devices 20 can each part off an edge strip 11. The cutting devices 20 can be moved laterally out of the transport path of the material web 10.

The complete spanning of the material web 10 has the effect that the edges of the material web 10 do not curl upwards or downwards. The combination of cutting devices 20 and the recesses 45 provided for the cutting devices 20 renders possible a clean cut for parting off the edge strip 11, since the edges of the material web 10 do not curl, or curl only minimally at the cutting point 21 (in this drawing, covered by the cutting devices 20). The use of two dynamic air guide boxes 40 and 40' allows selective control of the oscillation behaviour of the material web 10. Owing to the recesses 45 of the extension device 44 between these two air guide boxes 40, the stabilizing effect of the two air guide boxes is substantially unaffected. Owing to the edge strips 11 being parted off at the cutting points 21 in the region stabilized by the air guide boxes 40 and 40' and by the extension device 44, a higher quality of cut can be realized.

Figure 7:
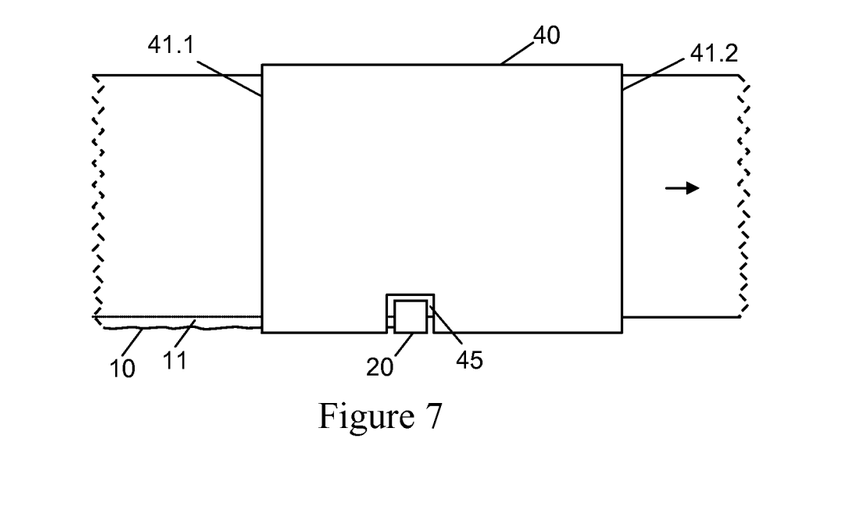
FIG. 7 shows an air guide box according to the invention, which has a recess for a cutting device.

FIG. 7 shows an air guide box 40 according to the invention, having directly a recess 45 for a cutting device 20.

The advantage is that the air guide box 40 now offers both the stabilizing effect and a possibility for cutting the material web 10 in the stabilized region. This is an alternative to modifying an air guide box 40 with the extension device 44, for example in the case of a newly constructed installation.

Figure 8:
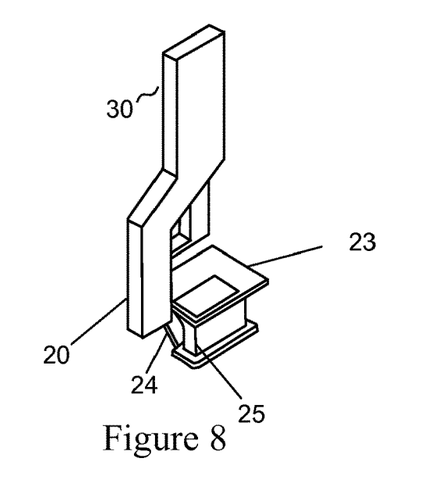
FIG. 8 shows a three-dimensional sketch of a structural unit consisting of a cutting device and a cutting table that has an inclined surface and a suction channel.

FIG. 8 shows a three-dimensional sketch of a structural unit 30 consisting of a cutting device 20 and of a cutting table 23 that has an inclined surface 24 and a suction channel 25. The cutting device 20 is a high-pressure water jet cutting device. Connecting hoses are not shown. The cutting table 23 has an inclined surface 24 and a shaft 25. During operation, the cutting device 20 can be moved together with the cutting table 23, since they are connected to one another. A vacuum is applied to the shaft 25, which vacuum then sucks the cut-off edge strip 11 into the inside of the shaft 25.

Because of the cutting device 20 being connected to the cutting table 23 to form one structural unit 30, actuation is simpler, and can be effected jointly.

Figure 9:
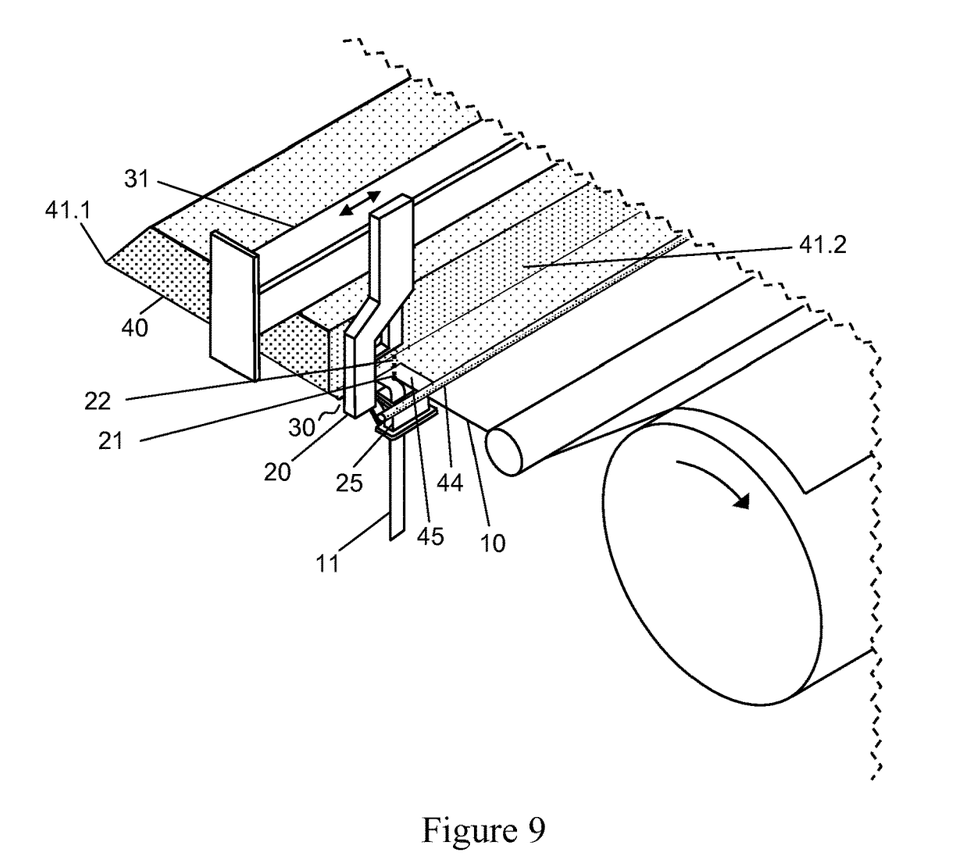
FIG. 9 shows a three-dimensional sketch of a portion of a paper production installation, according to the invention, having an air guide box, to which there is attached an apparatus for cutting a material web, which apparatus has an extension device having a recess, and has a cutting device and a cutting table that has an inclined surface.

FIG. 9 shows a three-dimensional sketch of a portion of a paper production installation, according to the invention, having an air guide box 40, to which there is attached an apparatus for cutting a material web, which apparatus has an extension device 44 having a recess 45, and has a cutting device 20 and a cutting table 23 that has an inclined surface 24. The cutting device 20 and the cutting table 23, having an inclined surface 24 and a shaft 25, again constitute a structural unit 30. There, the material web 10 runs through an apparatus according to the invention, to a succeeding reel. Here, the apparatus according to the invention for cutting a material web 10 consists of an air guide box 40 having a cutting device 20, which has an extension device 44. The extension device 44 has a rounded closure at the broad side 41.2 that is located downstream. In addition, a recess 45 is provided in the extension device 44. The structural unit 30, via a carrier beam 31 mounted transversely over the material web 10, is arranged so as to be movable transversely in relation to the material web 10.

During operation of the apparatus, the material web 10 is severed by means of a high-pressure water jet 22. The resultant edge strip 11 is removed via the shaft 25 provided on the cutting table 23. The edge strip 11 in this case is already sliding into the shaft 25 because of the forward motion of the material web 10. In addition, the edge strip 11 is sucked away out of the plane of the material web and into the shaft 25 by a suction device attached to the shaft 25. The inclined surface 24 provided on the cutting table 23 effects additional stabilization of the material web 10 over the cutting table. In the case of a web loading operation, the structural unit 30, consisting of the cutting device 20 and the cutting table 23, and of the elements attached thereto, is moved laterally out of the recess 45 by means of the carrier beam 31. This structural unit 30 is then moved back into the transport path of the material web 10, in order to support the newly incoming and extending web.

Since the structural unit 30, consisting of the cutting device 20 and the cutting table 23, is mounted in a movable manner, it can be moved laterally out of the transport path as desired for particular operations, and subsequently moved back into the transport path when required. Compared with the presence of a sharp edge, the rounded closure of the extension device 44 reduces, inter alia, the risk of a tear in the material web 10. This closure also serves to stiffen the extension device 44.

With the extension device 44, an invention has been made available by which an air guide box 40 can be extended and, consequently, a cutting apparatus can utilize the stabilizing effect of the air guide box 40 for a clean cut of the material web. Because of the method for extending for the purpose of cutting a material web 10, in which an air guide box 40 is extended by an extension device 44 in its effect as a web stabilizer and the material web 10 is then cut through at least one recess 45 in the extension device 44, it is now possible to effect a high-quality cut of the material web 10 in a region stabilized by an air guide box 40. In addition, the method enables existing installations for paper production to be upgraded.

REFERENCES

| | |
|---|---|
| 10 | material web |
| 11 | edge strip |
| 20 | cutting device |
| 21 | cutting point |
| 22 | high-pressure water jet or laser beam |
| 23 | cutting table |
| 24 | inclined surface |
| 25 | shaft |
| 30 | structural unit |
| 31 | carrier beam |
| 40 | air guide box |
| 41.1 | front broad side |
| 41.2 | rear broad side |
| 44 | extension device |
| 45 | recess |
| 46 | maximum clear opening |
| 46.1 | maximum clear opening in the longitudinal direction |
| 46.2 | maximum clear opening in the transverse direction |

The invention claimed is:

1. An apparatus comprising an extension device and an air guide box of a paper production installation, the air guide box having a flat uncovered exterior stabilization surface that stabilizes and prevents speed-induced oscillations in a portion of a material web moving with high speed through the paper production installation, which air guide box is characterised by a length in a length direction of the material web and a height in a direction perpendicular to both the length direction and a width direction of the material web, the air guide box having a front broad side and a rear broad side, at least one of which has a width b, wherein said extension device has a height and a length that are less than the height and length, respectively, of the air guide box, said extension device comprising a plate that does not define an interior of another air guide box, the plate having a width of at least 0.25*b and a length of at least 10 mm, and defining at least one fastening side and a surface, and wherein this surface of said plate has at least one recess having a maximum clear opening of at least 0.1 mm for the through passage of at least one high-pressure water jet or laser beam, said extension device attached to the air guide box by a flush connection between the fastening side of the plate and the broad side of the air guide box with said surface of said plate extending in a substantially same plane as the stabilization surface of the air guide box, such that said surface of said plate extends a dimension of the stabilization surface of the air guide box and thus extends a stabilizing effect of the air guide box on the material web beyond said dimension of the stabilization surface of the air guide box.

2. The apparatus according to claim 1, wherein the plate of the extension device has a width of at least 0.9*b and a length of at least 100 mm.

3. The apparatus according to claim 1, wherein the flat uncovered exterior stabilization surface of the air guide box includes a plurality of recessed air outlet openings and wherein a thickness of the plate of the extension device in a direction perpendicular to the web is less than the height of the air guide box.

4. An apparatus for cutting a material web, comprising:
at least one cutting device for generating at least one high-pressure water jet or for generating a laser beam, and
the apparatus according to claim 1, arranged above or below the material web,
wherein the at least one cutting device is arranged at the side of, over, or under the material web and at the level of the extension device with respect of the transport direction of the material web and
the at least one cutting device is configured to be advanced towards the material web so that the at least one high-pressure water jet or laser beam passes through the at least one recess provided in the extension device.

5. The apparatus for cutting a material web according to claim 4, further comprising at least one cutting table.

6. A method for producing a paper product in a paper production installation, the paper production installation including an air guide box having a flat uncovered exterior surface defining a stabilization surface that stabilizes and prevents speed-induced oscillations in a portion of a material web moving with high speed through the paper production installation, the air guide box characterised by a width in a width direction of the material web, a length in a length direction of the material web, and a height in a direction perpendicular to both the length and width directions of the material web, said method comprising:
arranging the air guide box over or under the material web with a gap therebetween and with the stabilization surface of the air guide box facing the material web and extending substantially parallel thereto, the gap between the stabilization surface of the air guide box and the material web receiving a flow of air in a direction of running of the material web, producing a negative pressure between the material web and the stabilization surface which creates a stabilizing effect on the material web as it runs past the air guide box,
providing an extension device having a height and a length that are less than the height and length, respectively, of the air guide box, the extension device comprising a plate that does not define an interior of another air guide box, the plate having at least one fastening side and at least one recess, said providing an extension device including determining a width of the extension device on a basis of the width of a particular side of the air guide box to which the extension device is to be attached;

extending a dimension of the stabilization surface of the air guide box, and thus extending the stabilizing effect of the air guide box on the material web beyond said dimension of the stabilization surface, by attaching said extension device to the particular side of the air guide box, said attaching comprising aligning a surface of the plate with the stabilization surface of the air guide box and connecting the fastening side of the plate to the particular side of the air guide box in a flush manner with the surface of the plate extending in a substantially same plane as the stabilization surface, thus defining substantially the same gap between the material web and the surface of the plate as between the material web and the stabilization surface, cutting the material web extending in the longitudinal direction in the paper production installation using at least one high-pressure water jet or at least one laser beam generated by at least one cutting device proximal to the air guide box, wherein said cutting by the at least one high-pressure water jet or laser beam is effected proximal to the at least one recess in the plate of the extension device.

7. The method according to claim 6, wherein the at least one high-pressure water jet or laser beam moves within the at least one recess and/or the at least one cutting device moves in a transverse direction relative to the at least one recess.

8. The method according to claim 6, further comprising positioning at least one cutting table on a side of the material web at which the high-pressure water jet or laser beam emerges from a plane of the material web after the cutting operation so that the high-pressure water jet or laser beam that has emerged from the plane of the material web is substantially incident upon the cutting table or is routed into an opening provided in the cutting table.

9. The method according to claim 6, wherein said attaching includes removably connecting the fastening side of the plate to the particular side of the air guide box.

10. The method according to claim 6, wherein a height of the plate in the direction perpendicular to the length direction of the material web and perpendicular to the width direction of the material web is less than the height of the air guide box.

11. The method according to claim 6, wherein the flat uncovered exterior surface of the air guide box includes a plurality of recessed air outlet openings and wherein a thickness of the plate in a direction perpendicular to the web is less than the height of the air guide box.

12. The method according to claim 6, wherein the air guide box has a flat surface, an upstream end and a downstream end, and wherein the extension device comprises a first plate mounted at the downstream end of the air guide box such that the downstream end of the air guide box is between the upstream end of the air guide box and the first plate, the method including conveying the material web along the flat surface from the upstream end past the downstream end and along the first plate, wherein the at least one high-pressure water jet or laser beam passes through the at least one recess before cutting the material web.

13. The method of claim 12, further comprising:

removing the first plate from the downstream end of the air guide box; and mounting a second plate at the downstream end of the air guide box, the second plate having at least one recess different than the at least one recess of the first plate.

14. The method of claim 12, further comprising directing the flow of air between the material web and the flat surface of the air guide box in a direction toward the downstream end of the air guide box and past a seam between the air guide box and the first plate at a rate greater than a longitudinal speed of the material web.

15. A method for producing a paper product in a paper production installation, comprising:

arranging an air guide box over or under a web of paper with a gap therebetween, the air guide box characterised by a width in a width direction of the web of paper, a length in a length direction of the web of paper, and a height in a direction perpendicular to both the length and width directions of the web of paper;

conveying the web of paper in a longitudinal direction along a flat uncovered exterior surface of the air guide box, the air guide box having an upstream end and a downstream end, the flat uncovered exterior surface being a stabilizing surface that extends substantially parallel to the web and that stabilizes and prevents speed-induced oscillations in a portion of the web as it moves with high speed through the paper production installation;

receiving in the gap between the stabilizing surface and the web a flow of air in a direction of running of the web, producing a negative pressure between the web and the stabilizing surface which creates a stabilizing effect on the web as it runs past the air guide box;

providing an extension plate having a height and a length that are less than the height and length, respectively, of the air guide box, the extension plate having at least one fastening side and at least one recess, said providing an extension plate including determining a width of the extension plate on a basis of the width of a particular side of the air guide box to which the extension plate is to be attached;

extending a dimension of the stabilizing surface of the air guide box without using an additional air guide box, and thus extending the stabilizing effect of the air guide box on the web beyond said dimension of the stabilizing surface, by mounting said extension plate at the downstream end of the air guide box, said mounting comprising aligning a surface of the extension plate with the stabilization surface of the air guide box and connecting the fastening side of the extension plate to the downstream end of the air guide box in a flush manner with the surface of the extension plate extending in a substantially same plane as the stabilizing surface, thus defining substantially the same gap between the web and the surface of the extension plate as between the web and the stabilizing surface; and directing at least one high-pressure water jet or at least one laser beam through the at least one recess of the extension plate to cut the web of paper.

16. The method of claim 15, further comprising:

positioning at least one cutting table adjacent to the extension plate such that the at least one high-pressure water jet or the at least one laser beam contacts the at least one cutting table after cutting the web of paper.

17. The method of claim 15, wherein said extension plate is a first extension plate, said method further comprising:

removing the first extension plate from the downstream end of the air guide box; and mounting a second extension plate at the downstream end of the air guide box, the second extension plate having at least one recess different than the at least one recess of the first extension plate.

18. The method of claim 15, further comprising directing the flow of air between the web of paper and the flat surface of the air guide box in a direction toward the downstream end of the air guide box and past a seam between the air guide box and the extension plate at a rate greater than a longitudinal speed of the web of paper.

19. The method according to claim 15, wherein the flat uncovered exterior surface of the air guide box includes a plurality of recessed air outlet openings.

* * * * *